UNITED STATES PATENT OFFICE.

MAX BAZLEN, OF LUDWIGSHAFEN, GERMANY, ASSIGNOR TO THE BADISCHE ANILIN & SODA FABRIK, OF LUDWIGSHAFEN, GERMANY, A CORPORATION OF GERMANY.

PROCESS OF MAKING HYDROSULFITES.

SPECIFICATION forming part of Letters Patent No. 692,760, dated February 4, 1902.

Application filed December 20, 1899. Serial No. 740,986. (No specimens.)

*To all whom it may concern:*

Be it known that I, MAX BAZLEN, doctor of philosophy, a subject of the King of Würtemberg, residing at Ludwigshafen-on-the-Rhine, in the Kingdom of Bavaria, Germany, have invented new and useful Improvements in Processes of Preparing Hydrosulfites, of which the following is a specification.

I have invented a new general process for the production of hydrosulfites, and by the aid of my new process I can produce solutions of hydrosulfites more concentrated and freer from impurities than any solutions of hydrosulfites hitherto known. This new solution constitutes a new and valuable article of commerce. Again, by a further step I obtain new solid alkaline and other hydrosulfites, which are also of great value in the art.

In the present application for patent I desire to claim my new general process for the manufacture of hydrosulfites, and I do not claim the new solid hydrosulfites nor the new solutions which constitute, respectively, the subject-matter of separate applications for Letters Patent, Serial Nos. 740,987 and 740,988, of even date herewith.

Technical sodium hydrosulfite, which is used for the reduction of indigo for the purpose of dyeing therewith, has hitherto generally been prepared by adding zinc-dust to a solution of sodium bisulfite, preferably while keeping the solution cool, and subsequently removing the zinc compound from the solution by means of lime. When this process is adopted, only about one-half of the sulfurous acid and of the sodium contained in the bisulfite is converted into the hydrosulfurous-acid salt. The remainder remains unused probably in the form of the sulfites of sodium and zinc. Grossman has described a process for using up to a greater extent this unused sulfite, which consists in adding mineral acids, particularly sulfuric acid, so that some of the sulfurous acid of the unconverted sulfite is set free and then by the further addition of zinc-dust the reduction is repeated. This process is described in the specification of the German Patent No. 84,507, and when working according to this specification about one-third more hydrosulfite can be obtained than can be obtained in the usual way; but the solution is less concentrated than the usual hydrosulfite solution, and it contains a considerable quantity of sulfates as an impurity.

I have devised a process by which it is possible not only to obtain pure and, when desired, highly-concentrated solutions of hydrosulfite, but also to convert practically the whole quantity of the bisulfite used into the corresponding hydrosulfite. My said process for the production of the hydrosulfite solution is based on the addition of free sulfurous acid to the bisulfite employed. The sulfurous acid may either be added in aqueous solution or it may be introduced in the form of gas. To obtain the best result according to this invention, the quantity of sulfurous acid added in either way is arranged to be one-half the total quantity otherwise contained in the bisulfite used. The solution thus obtained is then reduced with zinc-dust and treated with milk of lime. By working according to my new process not only is the entire quantity of alkali in the bisulfite fully used by being combined after the treatment with lime with the hydrosulfurous acid, but the formation of other salts as impurities is prevented, and the resulting solutions are, if desired, so concentrated and pure that it is possible to obtain from them solid and, as compared with any product hitherto prepared, very pure hydrosulfite by evaporation *in vacuo*. The solid hydrosulfite can better be obtained from this solution by separating it by means of common salt. I thus employ for the separation of inorganic bodies a method hitherto used in the arts only for organic bodies.

The following examples will serve to further illustrate the nature of the invention and the manner in which it can best be carried into practical effect:

Example 1: Take about twenty-five (25) kilograms of sodium bisulfite having a density of 40° Baumé, and to this add about fifty-four (54) kilograms of aqueous sulfurous acid containing about six per cent. $SO_2$, or prepare a similar solution by adding to the twenty-five kilograms of sodium bisulfite of the aforesaid density about fifty-one (51) liters of water and pass gaseous sulfurous acid through the solution until the weight has been increased by about three and a quarter kilograms. Then add slowly about four and one-fifth ($4\frac{1}{5}$) kilograms of zinc-dust. During this addition keep the solution at a temperature between 30° and 40° centigrade by suitably cooling. When all the zinc-dust has been added, stir for some time and then allow the mixture to stand for an hour or two. Next treat the liquid with milk of lime prepared from about four and one-fifth ($4\frac{1}{5}$) kilograms of quicklime and twenty (20) liters of water. Stir well, and finally allow the mixture to stand for at least six hours more. Then filter through a filter-press.

From the above-mentioned quantity of twenty-five kilograms of sodium bisulfite of 40° Baumé according to the usual process hitherto practiced sufficient hydrosulfite results to reduce rather less than five kilograms of indigo in the vat, while when working according to this example about eighty kilograms of sodium-hydrosulfite solution, possessing a density of about 11° Baumé, are obtained, which are sufficient to reduce twice the aforesaid quantity of indigo to indigo-white in the vat.

Example 2: In order to produce a highly-concentrated hydrosulfite solution, mix together about twenty-eight and four-fifths ($28\frac{4}{5}$) kilograms of sodium bisulfite of about 40° Baumé density and thirty-four and one-half ($34\frac{1}{2}$) kilograms of concentrated aqueous solution of sulfur dioxid, (containing about ten per cent. $SO_2$,) or prepare a similar solution by diluting the sodium-bisulfite solution with about thirty-one (31) liters of water and causing it to absorb the corresponding quantity of gaseous sulfur dioxid. To the solution obtained in either of the ways described add gradually about four and four-fifths ($4\frac{4}{5}$) kilograms of zinc-dust, as described in the foregoing example. Precipitate the zinc oxid with milk of lime prepared from four and four-fifths ($4\frac{4}{5}$) parts of quicklime and sixteen (16) liters of water and filter. When proceeding as hereinbefore described, one obtains a solution of the neutral sodium hydrosulfite, of which ten kilos are sufficient to reduce just under two kilograms of one hundred per cent. indigo. The quantities and strengths of the solutions given in this example are so calculated that the quantity of alkali present in the sodium bisulfite is after the reduction equivalent to the quantity of hydrosulfurous acid formed, so that neutral sodium hydrosulfite is obtained. Of course if the concentration of any of the solutions employed be varied corresponding alterations must be made in the quantities or strengths of the other ingredients in order to obtain the best results.

In the foregoing examples I have described the use of sodium bisulfite. Instead of this, however, I may use an equivalent quantity of any other bisulfite, such as potassium, ammonium, calcium, or chrome bisulfite.

Now what I claim is—

1. The process for the manufacture of hydrosulfites which consists in adding directly sulfurous acid as such to a commercially-pure bisulfite and reducing the mixture so obtained.

2. The process for the production of hydrosulfites consisting in adding to the bisulfite used a quantity of sulfurous acid equal to one-half the sulfurous acid otherwise contained in the said bisulfite and reducing this mixture with zinc-dust.

3. The process for the production of hydrosulfites consisting in adding to the bisulfite used a quantity of sulfurous acid equal to one-half the sulfurous acid otherwise contained in the said bisulfite and reducing this mixture with zinc-dust and treating the resulting liquid with milk of lime.

In testimony whereof I have hereunto set my hand in the presence of two subscribing witnesses.

MAX BAZLEN.

Witnesses:
   ERNEST F. EHRHARDT,
   JULIUS ABEL.